INVENTOR.
RICHARD R. EBY

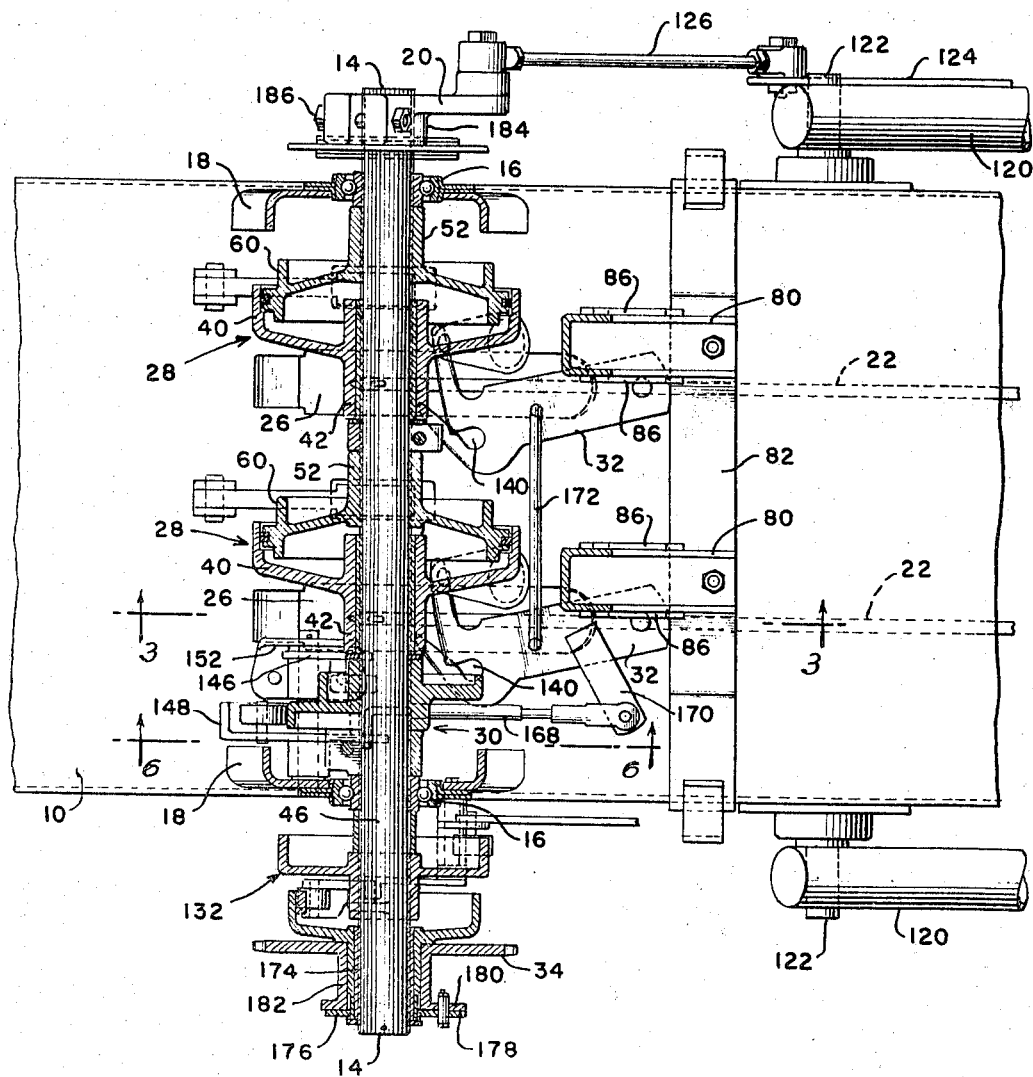

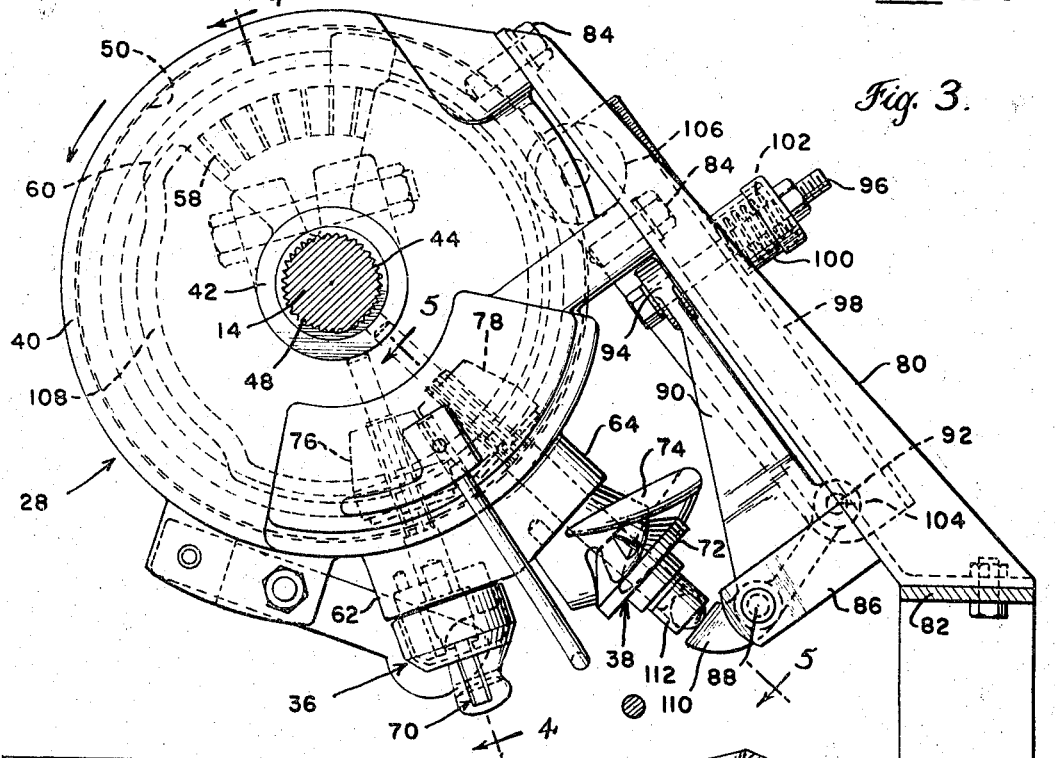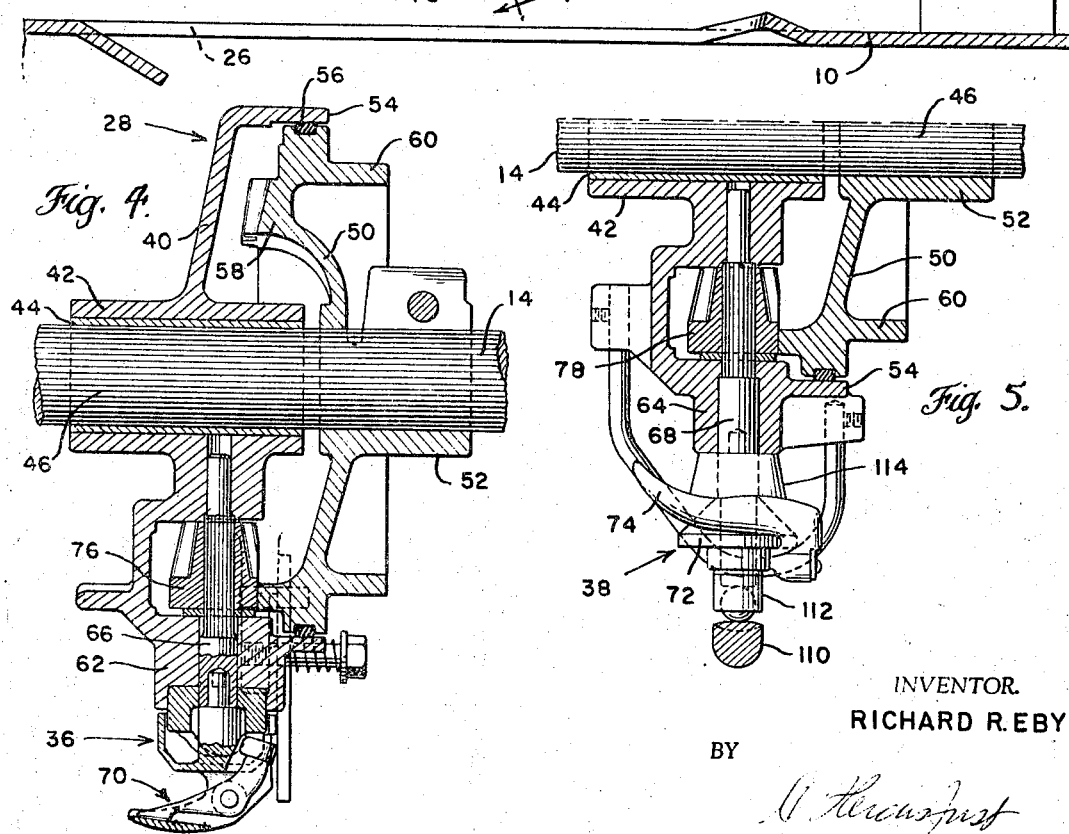

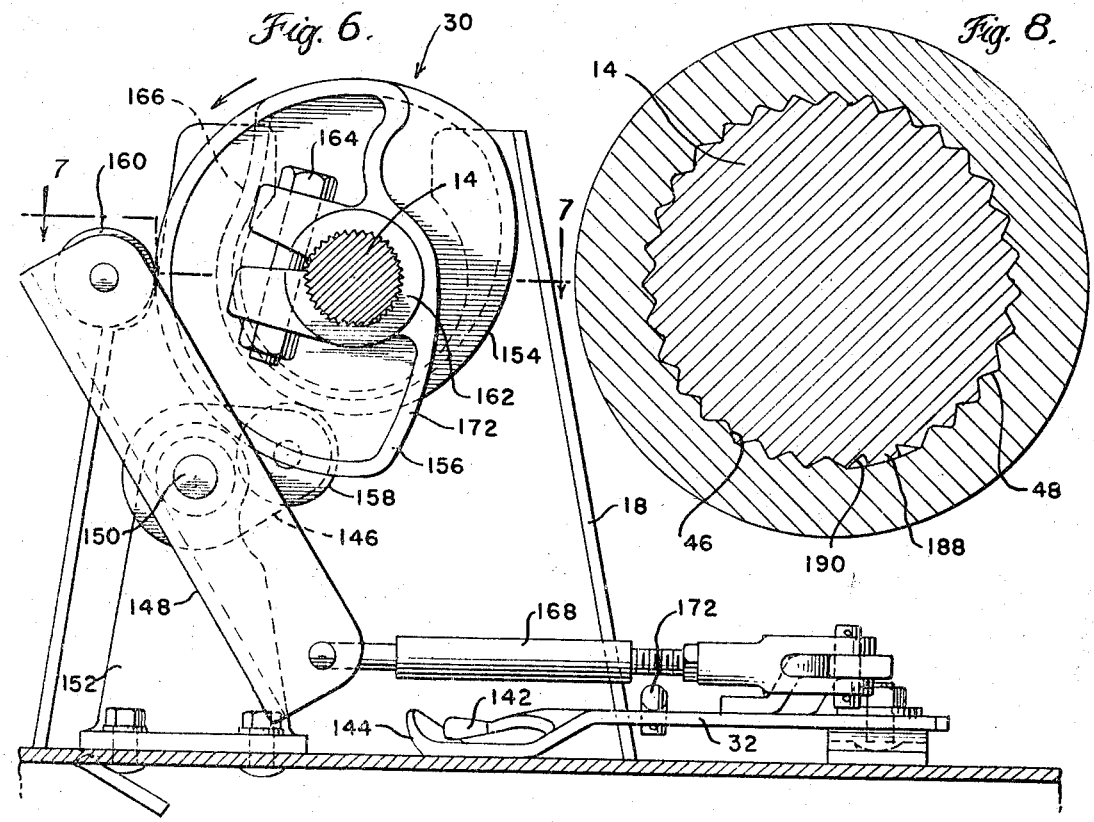
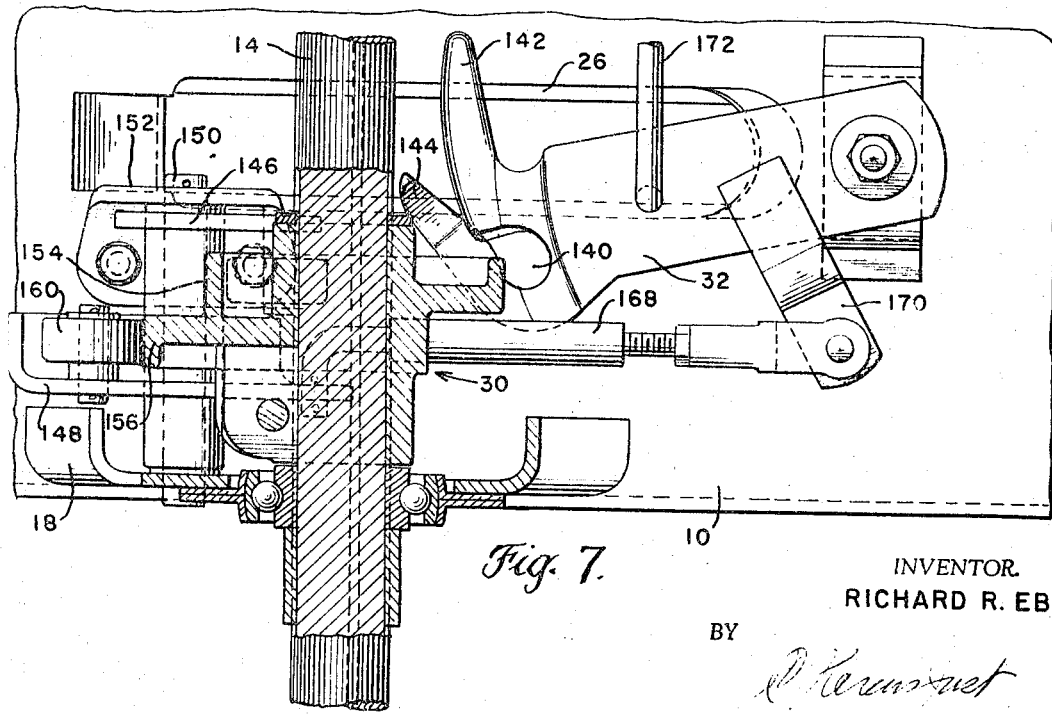

United States Patent Office 3,443,511
Patented May 13, 1969

3,443,511
DRIVE SHAFT FOR KNOTTER MECHANISMS FOR BALER
Richard R. Eby, Ephrata, Pa., assignor to Sperry Rand Corporation, New Holland, Pa., a corporation of Delaware
Filed Aug. 16, 1967, Ser. No. 661,035
Int. Cl. B65b *13/08, 13/28*
U.S. Cl. 100—22                                                    8 Claims

ABSTRACT OF THE DISCLOSURE

A baler having means to tie the ends of strands of tying material extending around a bale formed within a case and through which the bale moves as formed, means to project the trailing end of said tying strands around the trailing end of a bale, a drive shaft extending transversely of said case through said tying means, power-transmitting means connected to said drive shaft, and complementary, coengaging spline means on said drive shaft and all of said strand-tying and projecting units and power-transmitting means, said spline means comprising a continuous series of a substantial number of similar parallel splines extending longitudinally along the circumferential surface of said shaft from end-to-end thereof and disposed evenly in adjacent side-by-side positions around the entire circumference of the shaft to engage complementary coengaging spline means within hubs in said strand-tying and projecting means and power-transmitting means, thereby providing extensive adjustable rotary positioning and keyed connection of said hubs of said means upon said shaft, as well as substitution of other means, having similarly splined hubs, upon said shaft.

Cross-references to related applications

This application comprises one of a series respectively covering various improvements in knotter mechanisms for balers. While independent of each other, said improvements coact with each other in various ways to produce a desired ultimate result. In view of classification situations regarding such improvements, however, a series of applications have been filed respectively covering said improvements which, to some extent at least, have been made by different inventors.

Background of the invention

Heretofore, it has been customary in the baler industry to provide the purchaser with a selection of different kinds of tying units to secure different types of tying strands around a bale. The two principal strands used at present under such circumstances comprise those formed respectively from twine and wire. Recently, twisted synthetic plastics have been used as a type of twine. It is obvious that the tying means for these very substantially different types of materials necessarily must be of a different nature.

It further is obvious that the means for actuating such tying units and related mechanisms for utilizing these highly different types of tying materials are of quite different natures, notwithstanding the fact that, in general, they all employ a drive shaft. The drive shaft derives its power from a tractor which, for example, propels the baler around a field, or from an engine where the baler is self propelled.

Primarily because of the different natures and constructions of the tying units and associated mechanisms to be employed with the different types of tying strands, it has been the practice to provide a different drive shaft for each different type of tying unit. In order to connect movable members of the tying units and related mechanisms to such drive shafts for actuation thereby, it has further been common practice to provide different arrangements of keys ways in said different drive shafts, whereby the respective drive shafts were not interchangeable with each other with respect to the different types of tying units to be mounted thereon.

Accordingly, each such different tying unit is currently furnished with a drive shaft having one or a plurality of key ways formed therein, by milling or the like, and especially suited for the mounting of certain parts of tying units thereon in accordance with the selection of the purchaser for use with the desired type of tying strands, such as twine, plastics, or wire. This necessarily increases the cost of the tying mechanism assembly and also increases the time and expense of adapting the baler to utilize the particular type of tying mechanism selected by a purchaser.

Summary of the invention

The principal purpose of the present invention is to provide, primarily, a drive shaft for a baler arranged to be extended transversely to the axis of the case within which the bale is formed and also extend through hubs on certain parts of the several tier mechanisms selectively to be mounted upon said case respectively for purposes of each extending a strand of tying material, either twine, twisted plastics or wire, for example, around a compressed bale of material formed in said case, said drive shaft being keyed to said hubs of certain movable parts of said tier mechanisms and also being keyed to power-transmitting means, which is to actuate said drive shaft, by a novel arrangement of complementary coengaging spline means on said drive shaft and within the hubs connected to the movable parts of said knotter mechanisms, the spline means especially on said drive shaft extending continuously from end-to-end thereon and comprising a corrugated-like surface extending circumferentially and evenly around the entire exterior surface of the drive shaft.

It is another object of the invention to provide a selective indexed keying arrangement of certain movable parts of said tier mechanism upon such a splined drive shaft as set forth above, said selective keying being achieved by one end of one of the spline members upon said shaft being upset a limited amount to widen the same, and the shaft-receiving openings in the hubs of said various parts of the tier mechanisms mounted upon said shaft having an axially extending space complementary to said spline on said shaft having said upset end and said space being formed by removing or omitting a pair of adjacent splines within said hub throughout the length thereof to permit mounting of said hub upon said shaft in desired indexed relationship therewith determined by the reception of said spline on said shaft with the upset end within said space in said hub.

It is a further object of the invention to provide an exteriorly splined drive shaft extending through hubs of various parts of the tier mechanisms of a baler and universally engageable in desired indexed and driving relationship with said hubs, regardless of whether said tier mechanisms are of the type to be utilized with twine or wire and thereby minimize the cost of such tier mechanisms per se as well as minimizing inventory of an agricultural equipment dealer handling such balers for sale to consumers.

It is still another object of the invention to decrease the cost of providing key ways upon a drive shaft which supports various components of the tier mechanisms of balers by forming a corrugated exterior surface upon a drive shaft entirely along the full length thereof and extending around the entire circumference, said corrugated surface preferably being formed upon a shaft by a rolling and impressing operation as distinguished from cutting key ways therein to provide for the reception of complementary keying means formed within shaft-receiving openings

3 in hubs of members and mechanisms to be mounted thereon.

*Brief description of the drawings*

FIG. 2 is a top plan view and part section of the portion of the baler case shown in FIG. 1 as seen on the line 2—2 therein, looking in the direction of the arrows, and showing the splined drive shaft of this invention.

FIG. 3 is a fragmentary vertical sectional elevation of a knotter assembly on a larger scale than in FIGS. 1 and 2, as seen on the lines 3—3 of FIG. 2.

FIG. 4 is a fragmentary, sectional elevation of the assembly shown in FIG. 3 as seen on the lines 4—4 therein.

FIG. 5 is a fragmentary, sectional elevation of the assembly shown in FIG. 3 as seen on the lines 5—5 therein.

FIG. 6 is a fragmentary vertical sectional elevation of the assembly shown in FIG. 2 as seen on lines 6—6 therein.

FIG. 7 is a fragmentary sectional view of the assembly shown in FIG. 6 as seen in lines 7—7 therein.

FIG. 8 is a greatly enlarged exemplary sectional view of a typical hub of one of the parts of the assembly shown in FIG. 2 mounted upon the drive shaft thereof and keyed thereto by indexing means comprising a feature of the invention.

*Description of the preferred embodiments*

Figure 1:
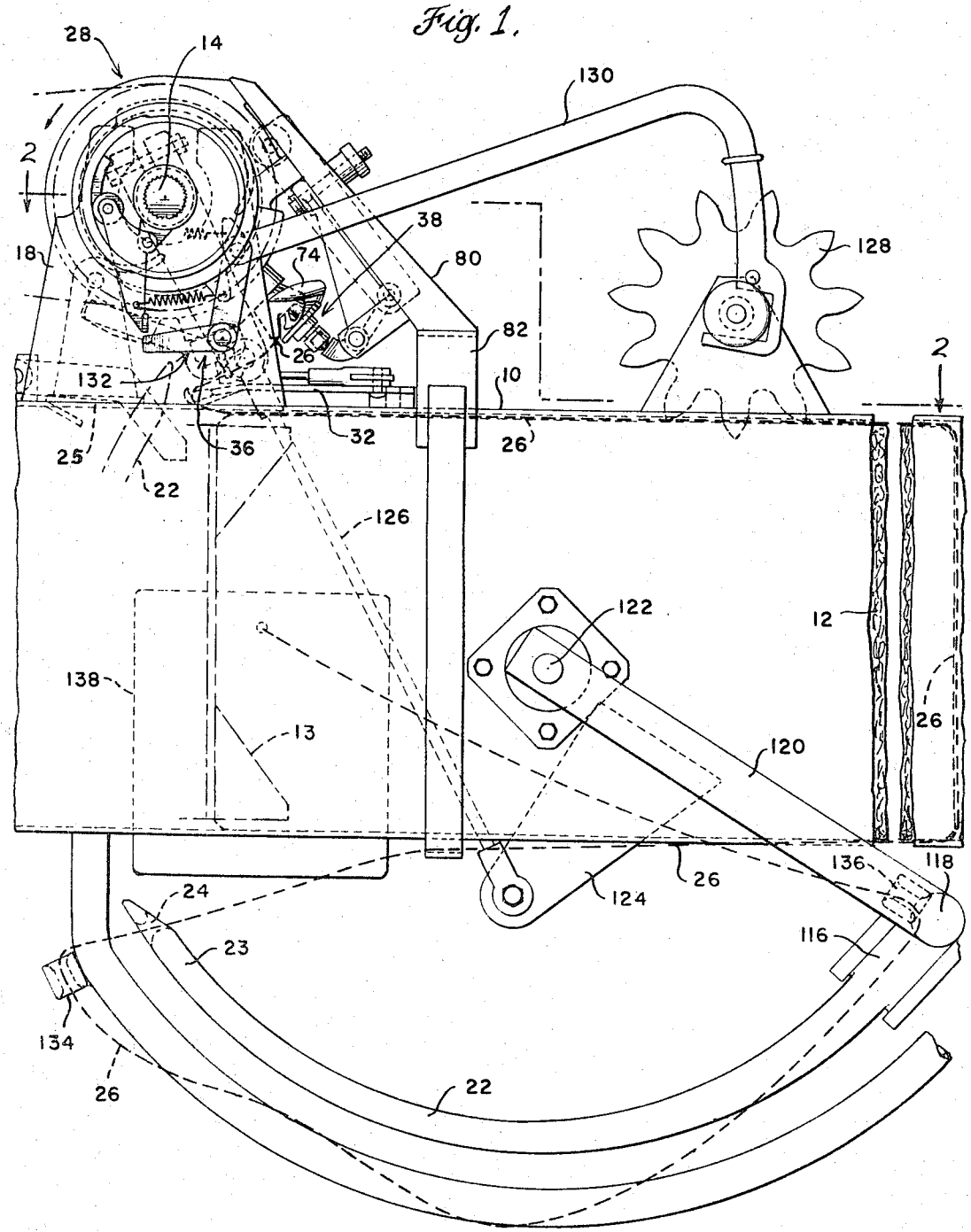
FIG. 1 is a fragmentary side elevation of the bale case portion of a baler upon which a knotter assembly is mounted for cooperative relative with an arcuate twine needle.

As previously referred to, to accommodate the choices of individual buyers of balers, a manufacturer of balers offers the customers a selection of devices by which strands are tied around bales, which devices are known generically as tiers, and specifically as wire tiers or twine knotter mechanisms. Appropriate devices of this type are designed and offered for sale respectively to be employed to tie together the opposite ends of twine or wire strands. Regardless of which type of strand material is employed to tie bales made by a baler, the ends of all of said different types of strands must be secured together, usually by means of a knot or twisted arrangement of some type.

Further, it is current practice to provide different types of tier mechanism assemblies respectively designed and constructed to operate with a selected type of tying strand and each including a drive shaft and various units and elements of different kinds having parts which are movable relative to other parts and driven by said drive shafts. Usually, such movable parts that are connected to the drive shafts have hubs and in order to connect such parts to said drive shafts for rotation thereby, it is essential that appropriate key ways be formed in such drive shafts and hubs for the reception of appropriate keys.

Notwithstanding the fact that tier mechanism assemblies respectively are adapted to operate with various types of tying strands, the functions which have to be performed by such different types of mechanisms are similar, at least to a large extent in that, in general, the leading end of each supply strand has to be appropriately clamped while the strand extends along the top of the bale being formed, for example, downwardly along the leading end thereof, and along the underside of the bale until the formation thereof has reached the point that tying is required. At that time, strand projecting members, extend the strand upwardly around the trailing end of the bale and into engagement with the tying mechanism which includes means to cut and clamp the trailing end of an individual strand from the supply strand to form a new leading end for another strand to be tied around the next bale. In general, all of the various elements of the mechanism assembly which accomplish the foregoing are driven by said drive shafts.

Forming keying means upon a drive shaft and related members connected thereto which are to be driven thereby is relatively expensive. This is because relatively slow, machining operations are employed, such as milling the key ways in the drive shafts, broaching them in the cylindrical interior surfaces of the hubs, and the like. Particularly where a number of key ways are to be located in a drive shaft in different circumferential positions, it is essential that the drive shaft be indexed between milling operations and accurately located for the next milling cut which is to occur. Such key ways also usually are required at various longitudinal positions along the drive shaft between the opposite ends thereof. As a result, a complete drive shaft for a specific type of tier mechanism is relatively costly. In general, also, such drive shafts are not interchangeable between the different types of tier mechanisms respectively arranged to accommodate and operate with the various types of tying strands referred to above.

For purposes of simplifying the illustration and description of the improvements in tier mechanisms for balers which comprise the present invention, a knotter mechanism assembly particularly designed to tie twine strands around a bale has been selected for exemplary presentation of the details and characteristics of the invention.

Referring to FIGS. 1 and 2 in particular, it will be seen that a fragmentary longitudinal portion of a substantially horizontal bale case 10 is illustrated. In FIG. 1, adjacent the right-hand end thereof, the case is additionally interrupted to foreshorten the same and also to show, in additional fragmentary manner, a portion of a bale 12 being formed in said case by a plunger 13. In its preferred construction, the case 10 is rectangular in cross-section.

Extending transversely across the top of case 10 and in vertically spaced relationship thereto is a timer drive shaft 14 which comprises an important feature of the present invention. The drive shaft preferably is substantially parallel to the top of case 10. The opposite end portions of the shaft extend through bearings 16 which are housed in the upper portions of a pair of vertical supporting standards or brackets 18 extending upward from the top of case 10 adjacent the opposite sides thereof and fixed thereto.

For purposes of initially briefly outlining the cooperating units, mechanisms and means which are interrelated for purposes of tying a plurality of strands around a bale and which include parts or portions that are actuated directly by shaft 14, the following overall description is set forth. With reference to FIG. 2 especially, it will be seen that at the upper end of shaft 14 as viewed in said figure, a crank arm 20 is connected to the shaft for purposes of actuating a plurality of twine needles 22, the function and details of which are described hereinafter, except to state that the tip ends 23 are provided with eyes 24 which carry sections of the tying twine 26, illustrated in dotted lines in FIG. 1, upwardly through elongated slots 26 formed in the top of case 10 as best shown in FIG. 2.

Cooperating with each of the needles 22 is a tier in the form of a knotter mechanism 28, the same being arranged in transversely spaced relationship to each other intermediately of the opposite ends of shaft 14, as shown in FIG. 2, and through portions of which said shaft extends. Also mounted upon shaft 14 is a compound cam 30 which actuates a plurality of twine fingers 32. In addition, a power-transmitting member 34 which is illustrated specifically as a sprocket gear in FIG. 2 also is keyed, at least indirectly to shaft 14 for purposes of rotating the same by means of power derived, for example, from the power take off of a tractor, not shown, which pulls the baler around a field.

Each of the knotter mechanisms 28 includes a knotter unit 36 and a clamping unit 38 which cooperate in sequence with each other to tie a knot in the strands of twine as the opposite ends thereof are brought into adjacent relationship incident to tying a bale. Both the knotter and clamping units 36 and 38 have movable members which require rotation at predetermined times in the cycle of operation of the entire knotter mechanisms of the baler and said movable members thereof are driven by means in the knotter mechanisms 28 which are connected to the drive shaft 14. All of the movements of the various elements and units of the entire overall knotter mechanism occur rapidly when the tying of the opposite ends of strands of twine around a bale into knots is to occur. The actual time usually is less than one second, whereby it can be understood that all of the cooperative relationships of the various members and units of the entire mechanism and apparatus must be precisely timed and interrelated to insure tying of satisfactory knots in the strands of tying material.

A principal objective of the present invention, therefore, is to insure that said aforementioned relationship is initially established and subsequently maintained through the provision of keying means of a type not heretofore employed in baler mechanisms for purposes of connecting, in desired adjustable position, upon the drive shaft 14, all of the various movable parts which are to be driven thereby.

Each of the knotter mechanisms 28 comprises a knotter frame casting 40 (FIG. 4) provided with a hub 42 having a cylindrical bore which receives a bearing sleeve 44 which surrounds shaft 14 and is keyed thereto by spline means 46 similar to those illustrated in FIG. 8 and comprising a substantial number of similar, individual splines parallel to each other and immediately adjacent each other around the entire circumference of shaft 14. Also, the spline means 46 extend uniformly between the opposite ends of the shaft 14. Such spline means preferably can be formed upon a shaft comprising a cylindrical rod of appropriate diameter, by compression rolling and somewhat swaging said spline means into the circumferential surface of the rod to form the shaft and provide said spline means thereon, whereby the exterior surface of the shaft is somewhat corrugated around its entire circumference and throughout its length.

The foregoing means of providing such keying arrangement as the spline means 46 upon shaft 14 is less expensive than cutting key ways by milling operations as is now conventional in shafts employed in current types of knotter mechanism for balers. In order to mount a part upon such a shaft and key the same thereto, it is only necessary to form a bore in a hub or the like to be mounted upon the shaft and shape the inner surface thereof so as to form complementary spline means 48, FIG. 8, around the interior surface of the bore within a hub or the like of one of the movable members of the various units or means comprising the entire knotter mechanism assembly. Such shape may be formed, for example, by precision casting. Said arrangement also provides an additional, highly effective and inexpensive means of indexing to the shaft, in desired and exact angular relationship, a member to be driven thereby.

The bearing sleeve 44, FIG. 3, is formed from suitable material and is provided on its interior with complementary spline means 48 which closely engage the spline means 46 on shaft 14 to key the bearing sleeve effectively thereto so as to rotatably connect shaft 14 by said sleeve within the hub 42 of the knotter frame casting 40 of each knotter mechanism 28. This arrangement properly aligns in a radial direction a closure member 50 (FIG. 4) having a hub 52 provided with complementary spline means on the interior thereof so as to be keyed directly to shaft 14. The perimeter of member 50 is circular to rotatably fit within the open face 54 of the knotter frame casting 40. A sealing gasket 56 is provided between the two relatively ratatable surfaces of casting 40 and closure member 50. Integrally connected to the inner face of closure member 50 is a segmental gear 58 and a cam flange 60 projects in an axial direction from the outer face of closure member 50.

The casting 40 is provided with integral bosses 62 and 64 which are bored in a radial direction with respect to shaft 14, as best shown in FIGS. 3–5, for providing bearings to rotatably support driven shafts 66 and 68 respectively supporting a bill hook unit 70 of the knotter unit 36 and a movable clamping member 72 of the clamping unit 38 which rotates an integral, curved, twine-positioning hook 74 on movable clamping member 72.

The intermediate portions of the shafts 66 and 68 are splined to key thereto for rotation therewith driven gears 76 and 78 which preferably are bevel type and are complementary to the arcuate segmental gear section 58 so as to be driven thereby when shaft 14 revolves. They also have bore complementary to the splined portions of said shafts. From FIG. 3, it will be seen that the segmental gear 58 is of limited extent but is adequate to revolve the gears 76 and 78, and the shafts 66 and 68 respectively keyed thereto, a single revolution. Due to the fact that the closure member 50 rotates in the direction of the arrow shown in the upper left corner of FIG. 3, it will be seen that the segmental gear 58 institutes rotation of bevel gear 76 of the knotter unit immediately prior to rotating bevel gear 78 of the clamping unit.

Each of the knotter frame castings 40 are directly connected to a rigid arm 80 which extends upwardly and rearwardly, with respect to the direction of movement of baler case 10, from a fixed bracket 82 which extends transversely across the top of baler case 10. The uppermost ends of the arms 80 are provided with holes complementary to appropriate tapped bores in each of the castings 40 to receive bolts 84 shown in FIG. 3, by which the castings 40 are directly connected stationarily to the arms 80.

The arms 80 also support a pair of short parallel ears 86 between the outer ends of which a pivot pin 88 extends for purposes of supporting one end of a bell crank 90 having an intermediate bearing 92 thereon. The upper end 94 of bell crank 90 is bored to reecive a bolt 96 which extends through a hole in a channel-shaped cam arm 98 intermediately of the ends thereof upon which a sleeve 100 is mounted which contains a compression spring 102. Intermediate bearing 92 of bell crank 90 is disposed between the opposite flanges of the cam arm 98 and a pivot pin 104 extends therebetween to connect the same pivotally. Disposed between the flanges of arm 98 adjacent the opposite ends thereof is a cam follower roller 106 which engages the cam flange 60 as it revolves during each revolution of shaft 14.

From FIG. 3, it will be seen that the major portion of the cam flange 60, which extends approximately 270° of its circumference, is of uniform radius and the opposite ends of said major portion are connected to a minor portion 108 which has a uniform radius of less extent than the radius of the major portion of the cam flange 60. Accordingly, when the minor cam portion 108 engages follower roller 106, the lateral extension 110 of bell crank 90 is moved in a direction to relieve pressure upon the terminal end 112 of shaft 68 and thereby releases the movable clamping member 72 from engagement with its cooperating surface in the stationary clamping member 114. This permits release of the terminal end of a strand of twine from clamping engagement between members 72 and 114 as when the tying of a knot in said strand has been completed by the bill hook unit 70 of knotter unit 36, followed by the clamping of the terminal end of a new strand of twine between said clamping members. The spring 102 provides resilient clamping pressure applied by the lateral extension 110 against the terminal end 112 of shaft 68 of the clamping unit 38.

The twine needles 22 are connected, preferably for limited adjustment at the base ends 116 thereof, to a cross-bar 118 of a needle yoke. The opposite ends of bar 118 are connected to and supported by a pair of radial arms 120, the opposite ends of which are pivotally supported by a pair of trunnions 122 respectively fixed to the opposite sides of case 10. One of the arms 120 has an actuating bar 124 connected thereto. The outer end of ear 124 is pivotally connected to one end of a connecting rod 126 and the opposite end thereof is pivotally connected to the outer end of crank cam 20.

During the aforementioned single revolution of shaft 14 which occurs when compressed material has been accumulated in case 10 sufficiently to form a single bale. This situation is controlled by the actuation of metering wheel 128 mounted on the end of a trip arm 130 which controls one revolution clutch mechanism 132 substantially of conventional type, for purposes of connecting driving movement of power sprocket gear 34 to shaft 14.

Immediately upon initiation of rotation of drive shaft 14, crank 20 revolves to cause the arms 120 which support the twine needles 22 to rotate clockwise as viewed in FIG. 1 and thereby bring the tip ends of the needles into association with the knotter and clamping units 36 and 38 as indicated fragmentarily, in phantom, in such partially projected position in FIG. 1. At the time this occurs, the terminal end of the strand of twine 26 is held clamped between the clamping members of clamping unit 38 and extends past the knotter unit 36, toward the right as viewed in FIG. 1, along the top of the bale 12, down and around the leading end of said bale and along the lower surface thereof, through the eye 24 in the end of needle 22 and then through guide member 134. From there, the twine 26 extends somewhat loosely in the region of the needles 22 when in their inoperative position shown in full lines in FIG. 1, over to the other guide member 136 carried by bar 118, for example, and from there to the supply container 138 in which a ball or other extensive supply formation of the twine is disposed for use.

It will be understood that one such container 138 is provided for each of the twine fingers 22 and knotter mechanisms 28. Upon the actuation of the twine fingers 22 in clockwise direction as viewed in FIG. 1, the tip ends of the needles carry an elongated loop of the twine 26 up around the trailing end of bale 12 and into engagement with bill hook unit 70 of knotter unit 36.

Such elongated loop of the twine extends from opposite sides of the eye 24 in the tip of each needle 22 and one of the strands of said loop is engaged by the rotating hook 74 to insure the movement of said strand into positive engagement with the bill hook unit 70. This operation brings said strand of the elongated loop into close engagement with the clamped terminal end of the same strand of twine which is held by the clamping unit 38. This results in two end portions of said strand being in adjacent, coextensive relationship for tying of the same into a tight knot by the knotter unit 36 and especially the bill hook unit 70 thereof. Details of the operation of unit 70 are described in greater particularity in other applications of the present series thereof of which the instant application is one.

Further to insure that the aforementioned adjacent coextensive ends of said strands of twine which are to be knotted together are held in such relationship at least momentarily adjacent the bill hook unit 70 of the knotter unit 36, the twine fingers 32 are actuated initially in clockwise direction, as viewed in FIGS. 2 and 7. This disposes said adjacent end portions of said strands of twine within the eye 140 of each bill hook, said eye having an entrance defined by the diverging pair of ears 142 and 144 which are best shown in FIGS. 7 and 8. Such clockwise movement of the twine fingers 32 in operative direction is accomplished by a portion of compound cam 30 which actuates a pair of interconnected levers 146 and 148 respectively fixed to a shaft 150, at longitudinally spaced locations thereon, as shown in FIG. 7. The opposite ends of shaft 150 are rotatably supported by bearing openings respectively formed in auxiliary bracket 152 and the adjacent standard 18, as shown in FIG. 7.

Compound cam 30 has a pair of integrally connected, axially spaced external type cams 154 and 156. Cam 154 actuates cam follower roller 158 supported by the outer end of lever 146, and cam 156 engages cam follower roller 160 which is rotatably supported by the outer end of lever 148 which extends upwardly from shaft 50 as viewed in FIG. 6.

The compound cam 30 revolves in the direction of the arrow shown in FIG. 6, during a portion of the single revolution thereof by the shaft 14 which extends through hub 162 thereof. Said hub is radially split to provide a pair of ears which are moved slightly into clamping engagement by the clamping bolt 164. The inner surface of the bore within hub 162 is splined in a complementary manner to shaft 14. Certain segments of the cams 154 and 156 have uniform radii, while other, activating portions of said cams respectively engage cam followers 158 and 160 for pivotal movements of levers 146 and 148.

The position of the mechanism shown in FIG. 6 is substantially the initial operating position of the compound cam 30 at the commencement of a knotting operation. Accordingly, when active portion 166 of cam 154 engages follower roller 158, the bell crank arrangement of levers 146 and 148 results in movement thereof in clockwise direction as viewed in FIG. 6. This causes connecting link 168, which preferably is longitudinally adjustable, to move toward the right as viewed in FIGS. 6 and 7 and thereby move twine finger 32 clockwise as viewed in FIG. 7 by means of the integral ear 170 thereon to which one end of connecting link 168 is connected.

Such clockwise movement of the twine finger 32 shown in FIG. 7 is communicated to the other twine finger 32 shown in FIG. 2 by means of connecting rod 172 which extends between the pair of twine fingers 32 shown in FIG. 2. Such movement disposed said adjacent coextending ends of the strand of twine within the eye 140 of each of the twine fingers to hold them in preferred relationship with the knotter unit 36 as described above. Following the completion of knotting of said ends together, the latter portion of the revolution of compound cam 30 results in active portion 172 of cam 156 engaging flower roller 162 to move it in a direction to cause the bell crank arrangement to move in counterclockwise direction which similarly results in the pair of twine fingers 32 moving in counterclockwise direction. This is desirable especially to insure that the completed knots of each strand of twine will be removed positively from engagement with any portions of the bill hook units 70 of the knotter units 36. At the completion of such movement, the twine fingers 32 are restored to the positions shown in FIGS. 2 and 7.

From FIG. 2, it will be seen that the power-transmitting member comprising sprocket gear 34, while not directly keyed to shaft 14 as shown in said figure, nevertheless is securely pinned to a sleeve 174 to which a disc 176 is connected by appropriate splines against relative rotation. Disc 176 is provided with an ear 178 which is bolted to a corresponding ear 180 extending outward from the outer end of the hub 182 of the sprocket gear 34. The sleeve 174 has a bore which is splined in complementary manner to the spline surface of drive shaft 14, whereby, at least in effect, the hub 182 of sprocket gear 34 is directly keyed to shaft 14.

On the opposite end of shaft 14, as seen particularly in FIG. 2, the hub 184 of crank arm 20 preferably is radially split to provide a pair of ears which are clamped into firm engagement with shaft 14 by means of a clamping bolt 186. However, the hub 184 also is provided with a bore which, on the interior thereof, has a complementary splined arrangement provided for keyed attachment to the exterior of shaft 14.

From the foregoing, it is apparent that an inexpensive type of drive shaft 14 may be provided simply by rolling the splined configuration on the exterior surface thereof and such shaft may be formed in any desired lengths without requiring expensive milling or other machining operations in order to provide keying means thereon. Accordingly, by selecting a drive shaft of suitable diameter, a plurality of different types of tier mechanisms, respectively adapted to operate upon twine, or wire, and the various hubs and other connecting means of the elements and units to be mounted upon said shafts will be provided with complementary splined interior surfaces, all of the same diameter as the outer diameter of the drive shaft. Such complementary splined surfaces may be formed by precision casting for example.

By this arrangement, it is further apparent that in order to provide a selected type of tier mechanism upon a baler for a purchaser desiring that particular type of tier, only the various units and members which are not common between the various overall assemblies and knotter mechanisms need be taken from stock and mounted upon the drive shaft 14 which will be arranged to be common to all such different types of knotter mechanisms and related members and apparatus. Thus, the standards or brackets 18 may be mounted upon the case 10 at the time of manufacturing the baler, the bearings 16 may be mounted therein, and the drive shaft 14 installed therebetween. If desired, the inner race of the antifriction bearings 16 may be provided with corresponding complementary splines to the spline surface of the drive shaft 14 and thereby insure rotation of the inner races of the bearings with respect to the outer races and antifriction balls.

Upon determining the type of knotter mechanisms to be mounted upon shaft 14, it is a simple matter to remove the shaft from between the standards 18 and simply thread the various desired units, members and mechanisms upon the shaft, in the desired angular relation thereto, while it is gradually moved axially from one side of the baler case toward the other, until all of the required units, elements and mechanisms are mounted upon the shaft and the leading end thereof is inserted through the bearing of the other standard, followed, for example, by attachment of either the power-transmitting member 34, comprising the sprocket gear illustrated in FIG. 2 thereon, or the mounting of crank arm 20 thereon, depending upon the side of the baler from which the shaft initially was projected for movement toward the other side.

When the various elements and spacing sleeves thus are mounted upon the drive shaft in desired axial position with respect to each other, the various clamping bolts for the radially split hubs and the like then are tightened and the coengaging splined surfaces on the drive shaft and various hubs of the movable parts of the different units and mechanisms will inure against relative rotation between the shaft and said parts.

The invention also comprises relatively inexpensive yet highly effective indexing means which may be employed in a much less expensive manner than presently used milled key ways in shafts and broached key ways in the hubs of members to be mounted upon the shaft. Certain of these employ so-called straight keys, while others employ arcuate, Woodruff keys in accordance with common practice. The indexing means afforded by the present invention, as referred to, is best illustrated in FIG. 8 wherein a typical transverse sectional view of an enlarged shaft 14 is illustrated as having exterior spline means 46 extending entirely circumferentially therearound in the manner described above. Referring to the lower portion of said figure, it will be seen that one spline 188 has been upset or flattened, preferably only at the end thereof. This may be accomplished readily such as simply by tapping the end of said spline with the narrow face of a machinist's hammer, the end of a drift punch, or otherwise. Preferably, the end of only a single spline is thus flattened. By utilizing such arrangement, the spline 188 which has said flattened end thereon controls the indexed mounting of all of the elements to be connected thereto such as the various hubs of the parts of the numerous units and members which are to be rotated by the shaft during the knotting cycle.

Under the foregoing circumstances, all of the hubs of the units and members which are to be mounted upon the shaft are indexed thereon in required manner and the positions thereon are controlled by the spline 188 of shaft 14. The complementary internal spline means 48 within each of said hubs and members to be registered with spline 188 of shaft 14 is provided with an indexing space 190 which actually comprises a relatively shallow groove sufficiently wide to accommodate the flattened end of spline 188. Said space or groove extends within the hub or member for the full axial length of the member, whereby said member or hub may be moved in an axial direction freely with respect to the shaft, from end-to-end thereon if desired, but preventing relative rotation between the two.

The space or groove 190 is formed preferably by removing or omitting a pair of immediately adjacent internal splines of the spline means 48 from such splined surface, such as by broaching or the like, or when spline means 48 is initially formed, such as by precision casting. In view of the fact that the radial dimention of the splines 46 and 48 as shown in FIG. 8, under normal circumstances, is materially less than the depth of milled key ways conventionally used, formation of groove 190 by physical removal of such an adjacent pair of spline members from the spline means 48 may be accomplished quickly and inexpensively such as by broaching. When such indexing space 190 is formed in each of the hubs and other members to be mounted upon shaft 14, after the latter has been provided with the upset spline 188 thereon, it is impossible to mount any of said members upon the shaft in any angular position other than in properly oriented position with the shaft as dictated by spline 188 and grooves 190.

What is claimed is:

1. A baler of the type to tie a plurality of tying strands around a bale of compressed material in transversely spaced relation to each other and comprising in combination, a bale case in which material is compressed into bales and through which they move when tied by said strands, a plurality of strand-tying units mounted in transversely spaced relationship to each other on said case and each including movable driven members having hubs, a corresponding number of strand-projecting members spaced transversely of said case similarly to said strand-tying units and operable to project a tying strand around a bale of material when formed in said case, means having a hub connected to said members to drive the same, a timer drive shaft extending transversely of said case and through said hubs of said driven members of said strand-tying and projecting units and supported for rotation about its axis, a power-transmitting member having a hub connected to said drive shaft, and complementary coengaging spline means on said drive shaft and all of said hubs of said members of said strand-tying and projecting units and said power-transmitting member, said spline means comprising a series of similar parallel splines extending longitudinally along the circumferential surface of said shaft and disposed evenly in adjacent side-by-side positions around the circumference of said shaft and the complementary coengaging spline means in said hubs of said members being formed in the interior of said hubs which receive said shaft, thereby affording adjustable positioning of said hubs of said members around and along the axis of said shaft and connection of said hubs to said shaft and also substitution of other members having similar splined hubs upon said shaft.

2. The baler according to claim 1 in which the splines of said spline means upon said shaft extend from one end of said shaft to the other and are closely and immediately adjacent each other to comprise a corrugated surface, and said splines also being of sufficient depth to provide effective keying with said complementary splines in said hubs of said members through which said shaft extends to connect said shaft in driving relationship with said members of said units and means to which said hubs are connected.

3. The baler according to claim 1 further including cylindrical bearing sleeves having a smooth cylindrical exterior bearing surface and a splined interior surface complementary to and receiving the spline means of said drive shaft to provide a smooth bearing means for said shaft at selected locations and received in bearing openings in relatively stationary parts of said units to permit actuation of other parts of said units by rotation of said shaft relative to said bearing openings when said shaft is rotated.

4. The baler according to claim 1 further including selective positioning means on said drive shaft and parts of said units and means mounted upon said shaft, said selective positioning means comprising an upset end on one spline on said shaft to increase the width thereof and a complementary space in each hub mounted upon said shaft in registry with said one spline and the parts of said units and means connected to said hubs respectively being indexed thereby relative to said shaft, said spaces in said hubs each comprising an omitted pair of adjacent complementary splines in the opening for said shaft in said hubs, thereby permitting only one angular position thereof relative to said shaft.

5. The baler according to claim 1 arranged to tie a plurality of strands of twine around a formed bale and said tying units supported upon said case being arranged to accommodate twine and operate therewith to tie ends of a strand thereof into a knot, said baler also including a pivotally movable twine finger operably positioned respectively adjacent each twine-tying unit, and cam means having a hub receiving said shaft and operable to interengage said twine fingers to acutate the same to position strands of twine operatively relative to said tying units, said hub of said cam means having an inner splined surface complementary to the spline means on the exterior of said drive shaft and keyed thereby to said drive shaft for actuation thereby.

6. The baler according to claim 5 further including an upset end on one of said splines on said shaft to widen the same and thereby prevent reception thereof between a pair of complementary splines in said hubs mounted upon said shaft, and said hubs each having a space extending longitudinally from end-to-end therein and complementary to said spline having said upset end thereon and in indexed relationship thereto to position said hubs in desired operative relationship with respect to said drive shaft, said spaces within said hubs comprising a single pair of adjacent splines removed from the interior of said hub for the entire length thereof and thereby providing only a single indexed position of each of said hubs upon said drive shaft.

7. In a hay baler, a bale case, a drive shaft rotatably mounted on said bale case, a plurality of strand tiers on said bale case, needle means for projecting strands across said bale case and to said tiers, and means for rotating said drive shaft, said drive shaft having longitudinal parallel splines of the same size and evenly angularly spaced around the circumferential surface of the shaft, and said tiers, needle means and rotating means each having hub means with internal splines complementary to and interfitting with the splines on said drive shaft whereby the hub means are slidable axially on the drive shaft and locked against angular movement relative thereto.

8. In a hay baler, a bale case, a drive shaft rotatably mounted on said bale case, a plurality of twine knotter mechanisms on said bale case provided with bearing hubs, needle means for projecting twine strands across said bale case and to said knotter mechanisms, means for rotating said drive shaft, said drive shaft having longitudinal parallel splines around the circumferential surface of the shaft, actuating means connected to said drive shaft and operable to actuate said knotter mechanisms and needle means, and bearing sleeve means on said shaft having internal splines complementary to and interfitting with the splines on the drive shaft and rotatable therewith, said bearing means being slidable axially on the drive shaft and rotatable within said bearing hubs of said knotter mechanisms for support of said shaft thereby.

References Cited

UNITED STATES PATENTS 3,086,450   4/1963   Tarbox _____ 100—22

FOREIGN PATENTS 568,647   4/1945   Great Britain.

BILLY J. WILHITE, *Primary Examiner.*

U.S. Cl. X.R.

100—4, 31